United States Patent [19]

Pietrobon et al.

[11] Patent Number: 4,928,049
[45] Date of Patent: May 22, 1990

[54] CIRCUIT FOR CONTROLLING CURRENT SWITCHING IN MULTIPLE INDUCTIVE LOADS, WITH SINGLE CURRENT DETECTOR, PARTICULARLY FOR WINDINGS OF STEP MOTORS

[75] Inventors: Giovanni Pietrobon, Treviso; Domenico Rossi, Cilavegna; Salvatore Pappalardo, Padova, all of Italy

[73] Assignee: SGS-Thomson Microelectronics SRL, Italy

[21] Appl. No.: 245,657

[22] Filed: Sep. 16, 1988

[30] Foreign Application Priority Data

Oct. 5, 1987 [IT] Italy .................. 22141 A/87

[51] Int. Cl.⁵ .............................................. H02P 8/00
[52] U.S. Cl. ....................................... 318/685; 318/696
[58] Field of Search ............................... 318/685, 696

[56] References Cited

U.S. PATENT DOCUMENTS

| | | | |
|---|---|---|---|
| 4,336,484 | 6/1982 | Marinko | 318/696 |
| 4,431,955 | 2/1984 | Faedi et al. | 318/696 |
| 4,476,421 | 10/1984 | Moriguchi | 318/696 |
| 4,574,228 | 3/1986 | Blue et al. | 318/685 X |
| 4,692,679 | 9/1987 | Hujita | 318/696 |
| 4,792,816 | 12/1988 | Kennedy | 318/696 X |

*Primary Examiner*—Bentsu Ro
*Attorney, Agent, or Firm*—Wolf, Greenfield & Sacks

[57] ABSTRACT

The circuit controls current switching in multiple inductive loads (L1, L2, L3, L4) fed by means of respective switching switches (SW1, SW2, SW3, SW4) and by means of respective current adjustment switches (SWA, SWB), and comprises a single sense resistor (R) in series to said switching switches, and a single comparator circuit (C, FF) adapted to generate a logical signal (Q) when the voltage across the sense resistor exceeds a reference voltage ($V_{ref}$), which drives a plurality of AND gates (PA, PB) which control said adjustment switches and the second inputs whereof are driven by respective square-wave signals in opposite phase with a period equal to twice the switching period.

3 Claims, 3 Drawing Sheets

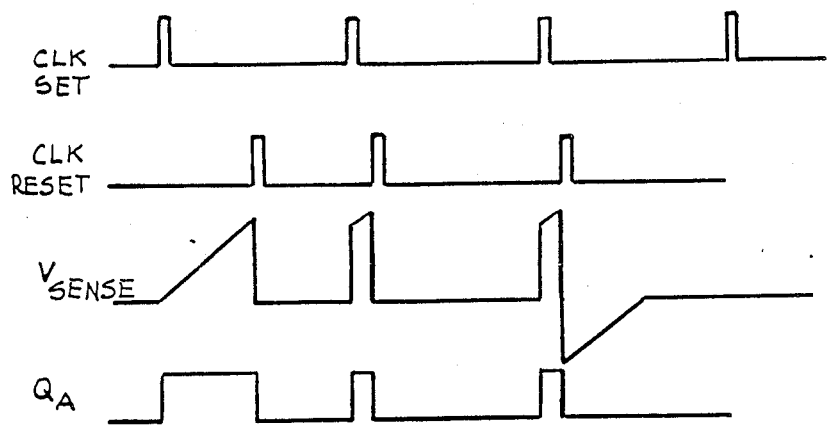
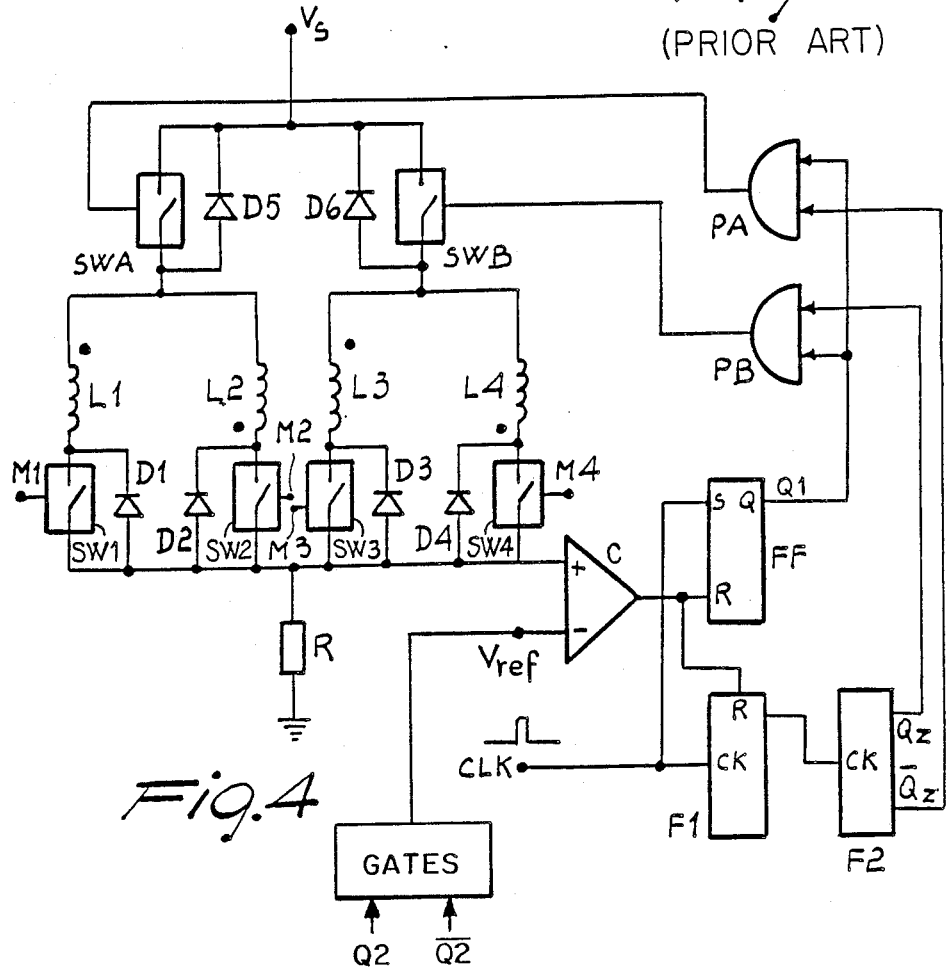
Fig.3 (PRIOR ART)
Fig.4

CIRCUIT FOR CONTROLLING CURRENT SWITCHING IN MULTIPLE INDUCTIVE LOADS, WITH SINGLE CURRENT DETECTOR, PARTICULARLY FOR WINDINGS OF STEP MOTORS

BACKGROUND OF THE INVENTION

1. Field of the Invention

The present invention relates to a circuit for controlling current switching in multiple inductive loads, particularly in windings of step motors.

2. Prior Art

Circuits of this type are known in the prior art which use, besides a switching switch for each winding, also an adjustment switch for each winding or each group of windings, each adjustment switch being controlled by its own comparator circuit (PWM loop) driven by its own measurement or sense resistor for the current in that particular winding.

In order to reduce the complexity of such switching control circuits, the use of a single adjustment switch, controlled by a single comparator circuit which is in turn driven by a single sense resistor, arranged in series to all the loads, is known. This simplified circuit, though it avoids the duplication of the PWM control loop, has however the disadvantage that it does not allow the independent adjustment of the current in the two windings, since the overlap of the feed phases of two loads can give rise to mutual influences among the loads, with redistribution of the related currents.

SUMMARY OF THE INVENTION

The aim of the present invention is therefore to provide a current switching control circuit in multiple inductive loads, particularly in windings of step motors, which uses a single sense resistor and a single comparator circuit, or PWM loop, though it maintains complete separation in the measurement of the currents in the loads.

This aim, as well as other objects and advantages as will become apparent hereinafter, is achieved by the invention with a circuit for controlling current switchings in multiple inductive loads fed by means of respective switching switches and by means of respective current adjustment circuits, characterized in that it comprises a single sense resistor in series to said loads, and a single comparator circuit adapted to generate a logical signal when the voltage across the sense resistor exceeds a reference voltage, which drives two AND gates which control said adjustment switches and the second inputs whereof are driven by respective square-wave signals in opposite phase with a period equal to twice the switching period.

BRIEF DESCRIPTION OF THE DRAWINGS

A preferred embodiment of the invention is now described, given only by way of non-limitative example with reference to the accompanying drawings, wherein:

FIG. 3 is a set of correlated waveform diagrams of various voltages present during the operation of the circuit of FIG. 1:

FIG. 4 is a current switching control circuit for the windings of a unipolar step motor according to a preferred embodiment of the invention.

DETAILED DESCRIPTION OF THE PREFERRED EMBODIMENTS

Figure 1:
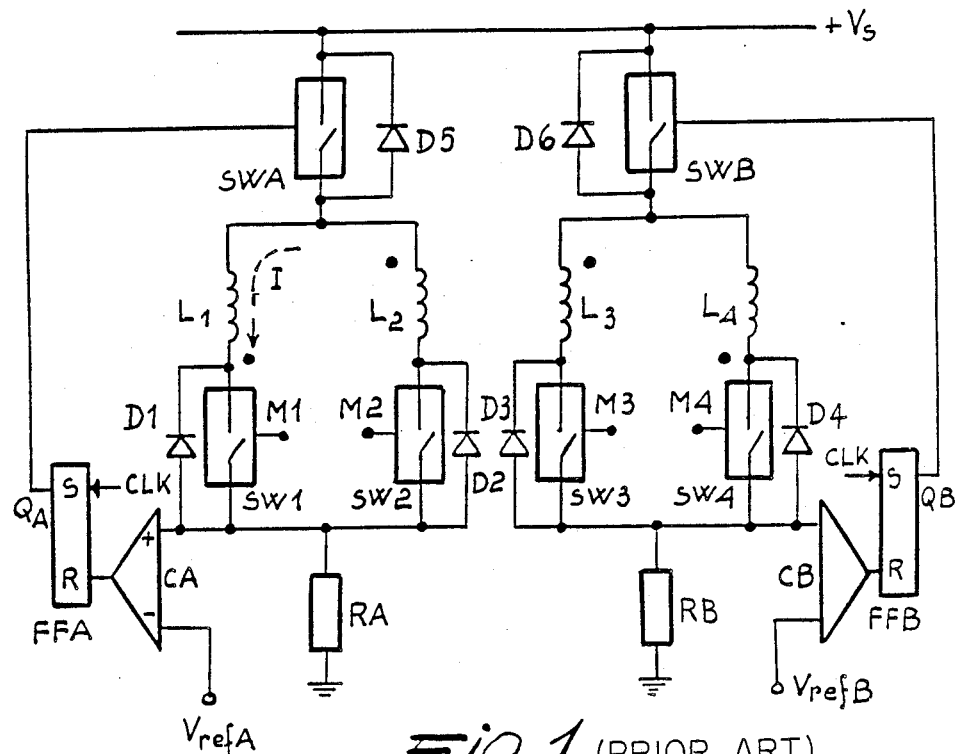
FIG. 1 is a current switching control circuit for the windings of a unipolar step motor according to the prior art.

In FIG. 1, L1 and L2 are the two parts of a first winding of a unipolar step motor or stepper (not shown), and L3 and L4 are the two parts of the second winding. SW1, SW2, SW3 and SW4 are switching switches arranged in series, having the purpose of activating the various steps of the motor in the sequence set by the mode of operation ("half step"/"full step"). The switches SW1, SW2, SW3, SW4 have respective freewheeling diodes D1, D2, D3 and D4 arranged in parallel, and have sense resistors RA and RB arranged in series and in pairs. The switches SW1, SW2, SW3 and SW4 are normally open, and are closed by means of "1" signals on respective control terminals M1, M2, M3 and M4 controlled by programmed circuits, not illustrated as they are beyond the scope of the invention.

The windings L1, L2, L3 and L4 are fed in pairs by means of current adjustment switches SWA and SWB, also normally open, with freewheeling diodes D5 and D6 in parallel, leading to a supply voltage $V_s$ and activated by the outputs Q of control loops (PWM loops) to adjust the current in the windings.

Said control loops comprise respective flip-flops FFA and FFB, synchronized with the set inputs by a clock signal CLK, and controlled on the reset inputs by the outputs of respective comparators CA and CB which compare the voltages across the resistors RA and RB with reference voltages $V_{refa}$ and $V_{refb}$.

Figure 2:
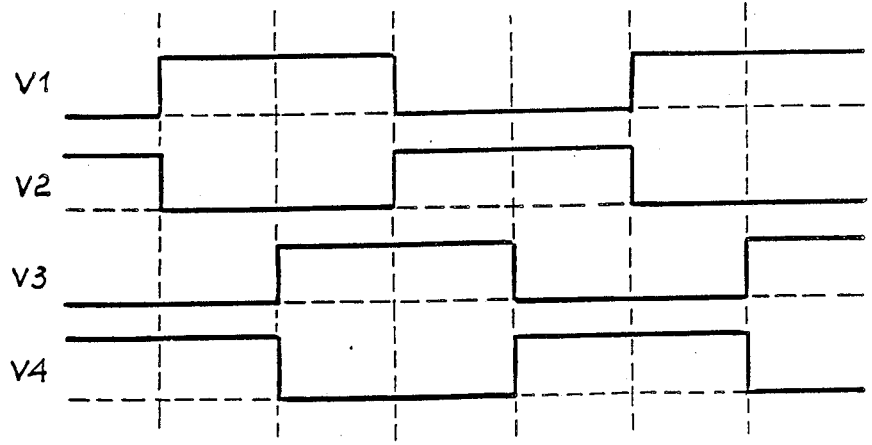
FIG. 2 is a diagram illustrating switching signals used in the circuit of FIG. 1.

FIG. 2 illustrates, by way of example, the behaviors of the switching signals V1, V2, V3, V4 for the four switches SW1, SW2, SW3 AND SW4 in the "full step" operating mode of the step motor.

Considering, for the sake of simplicity, only the control of the current in the half-winding L1, and with reference to the diagrams of FIG. 3, suppose that the switch SW1 is closed and that the current in L1 is initially zero. A clock signal CLK forces the output Q of the flip-flop FFA to "1", and the switch SWA therefore also closes. Consequently the current in L1 starts to rise in a linear manner, with a slope $V_s/L$, L being the inductance of the half-winding L1. The voltage $V_{sens}$ eacross RA rises according to the same rule. When this voltage exceeds $V_{refA}$, the comparator CA resets the flip-flop FFA, thus opening SWA.

To ensure the continuity of the electromagnetic flux, the current then closes in the link constituted by SW1, L1, L2, D2, slowly decreasing, since (if the resistive drop on the switch SW1 is ignored) the current recirculates on the direct voltage of the diode D2. During this operation the voltage on the sense terminal is zero.

The described cycle is repeated when a new clock signal occurs at the set input of the flip-flop. Both SWA and SW1 are switched off to bring the current to Zero.

This known control circuit allows to independently adjust the current in the two windings, but has the disadvantage of requiring two control loops each comprising a comparator and a flip-flop.

An alternative circuital solution used in the prior art, which avoids the abovementioned circuit duplication, consists of using only one current adjustment switch and a single sense resistor in series to all the windings, with a single feedback loop to control the adjustment switch. On the other hand the disadvantage of this solution resides in that the single resistor, measuring all the current simultaneously, does not allow to precisely separate the various steps, since there is a mutual influence, though small, among the various steps.

With reference to FIG. 4, a preferred embodiment of a circuit for controlling the switching in the windings of a unipolar step motor is now described. The same reference numerals have been used in FIG. 4, where possible, for the parts identical to those of FIG. 1.

The circuit according to the invention is similar to the known one described above regarding the switches SW1, SW2, SW3, SW4 with related diodes in parallel, and the switches SWA and SWB with related diodes. This circuit, however, comprises only one sense resistor R, and a single control loop, again comprising a flip-flop FF synchronized by a clock signal CLK and controlled by a comparator C which compares the voltage across the resistor R to a reference voltage $V_{ref}$. The output Q of the flip-flop FF drives two AND gates, PA and PB, the outputs whereof control the switches SWA and SWB.

To generate the second input signals at the gates PA and PB, the circuit comprises a first and a second flip-flop F1 and F2 of the toggle type, cascade connected. The flip-flop F1 is driven by the clock signal CLK, having twice the frequency with which the current in the motor is to be controlled, and with the reset input controlled by the output of the comparator C. The output Q1 of the F1 controls the flip-flop F2, the outputs whereof Q2 and $\overline{Q2}$ constitute the inputs for PA and PB.

In general, the reference voltage $V_{ref}$ assumes two different values $V_{ref1}$ and $V_{ref2}$ during the operation of the circuit, in relation to the two windings L1. L2 and L3. L4 of the motor, with the same period as the signals Q2, $\overline{Q2}$ for the control of the gates PA and PB. This can be provided, for example, by using two analogic gates connected to the input of the comparator and controlled by the same signals Q2, $\overline{Q2}$, not shown as they are obvious to the expert in the field.

Figure 5:
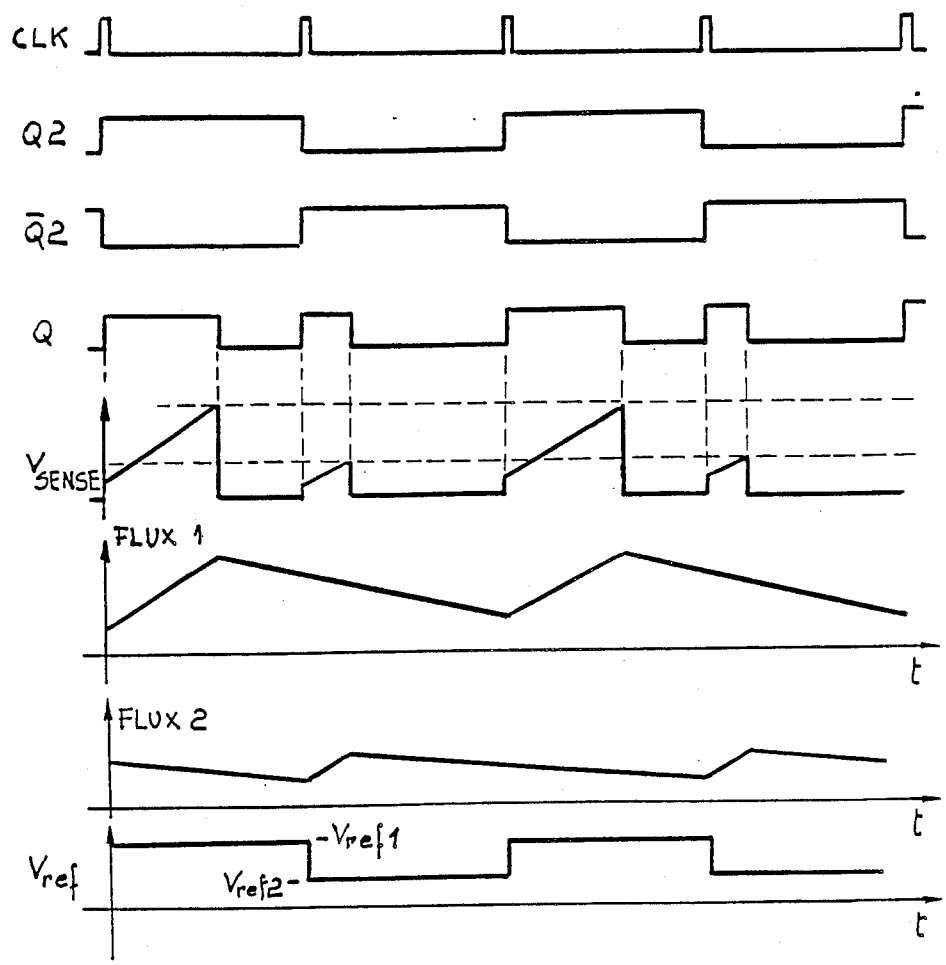
FIG. 5 is a set of correlated waveform diagrams of various signals present during the operation of the circuit of FIG. 4.

With this circuital arrangement, and with reference to the diagrams of FIG. 5, the first diagram illustrates the signal CLK with required timing. The signals Q2 and $\overline{Q2}$ are then two square waves in opposite phase, with a period equal to twice that of CLK. The signal Q is constituted by pulses having a duration which depends on the switching threshold of the comparator C, but having the rising fronts occurring at the same frequency as CLK. If the reference voltages for the two loads are different, as illustrated in the last diagram, the voltage $V_{sense}$ across R, which starts every time from the same initial value with identical slope, causes the comparator C to a trigger at different thresholds for the two loads, and this reflects in the different behaviour of the fluxes in the two windings.

The gates PA and PB ensure that the two switches SWA and SWB never conduct simultaneously, and therefore the resistor R always measures only one of the currents. The currents in the two windings are thus defined in a fully independent manner.

Naturally the control signals of the second inputs of the gates PA and PB may be provided in another manner, according to a given clock signal, while remaining within the scope of the inventive concept.

Furthermore, though reference has always been made to the control of a step motor, this only a preferred application of the invention, but the invention can be applied to different multiple inductive loads, e.g. to two bridge-connected or half-bridge connected inductors, the switching switches being also controlled, fully or partially, by said output signals of the AND gates.

A preferred embodiment of the invention has been described, but it is understood that it is susceptible to equivalent modifications and variations on the part of the expert in the field, according to the given teachings, without thereby abandoning the scope of the inventive concept.

We claim:

1. A circuit for controlling current switching in multiple inductive loads fed by means of respective switching switches and by means of respective current adjustment switches comprising a single sensor resistor connected in series to said switching switches, and a single comparator circuit adapted to generate a logical signal when the voltage across the sensor resistor exceeds a reference voltage ($V_{ref}$), said single comparator circuit driving through said logical signal respective first inputs of a plurality of AND gates, said plurality of AND gates controlling said current adjustment switches, and respective second inputs of said plurality of AND gates being driven by respective square-wave signals from a circuit means in opposite phase with a period equal to twice the switching period of a clock signal inputted to said circuit means.

2. The control circuit according to claim 1, wherein said square-wave signals generated by said circuit means comprises two cascade coupled flip-flops, the first of the two flip-flops being controlled by said clock signal with a frequency equal to twice the output frequency of said circuit means.

3. The control circuit according to claim 1 further comprising means for changing said reference voltage ($V_{ref}$) in correlation with the transitions of said square-wave signals.

* * * * *